US005593132A

United States Patent [19]

Hrytzak

[11] Patent Number: 5,593,132

[45] Date of Patent: Jan. 14, 1997

[54] ELECTROMAGNETIC ACTUATOR ARRANGEMENT FOR ENGINE CONTROL VALVE

[75] Inventor: Bernard J. Hrytzak, Chatham, Canada

[73] Assignee: Siemens Electric Limited, Chatham, Canada

[21] Appl. No.: 497,680

[22] Filed: Jun. 30, 1995

[51] Int. Cl.$^6$ ........................... F02M 25/07; F16K 31/06

[52] U.S. Cl. ........................... 251/129.15; 335/281

[58] Field of Search ........................... 251/129.15, 129.18; 123/571; 335/249, 251, 255, 278, 281

[56] References Cited

U.S. PATENT DOCUMENTS

| | | | |
|---|---|---|---|
| 4,961,413 | 10/1990 | Grey et al. | 123/571 |
| 5,435,519 | 7/1995 | Everingham | 251/129.15 |
| 5,460,146 | 10/1995 | Frankenberg | 251/129.15 X |
| 5,467,962 | 11/1995 | Bircann et al. | 251/129.15 |
| 5,494,255 | 2/1996 | Pearson et al. | 251/129.15 |

*Primary Examiner*—Kevin Lee

[57] ABSTRACT

Improvements in an armature-pintle assembly (36) and related stator structure (56, 58) of a solenoid actuator used in an EGR valve (10) for controlling the EGR valve opening in accordance with an electric control current from an engine control system. The stator structure defines an air gap (80) disposed in proximate surrounding relationship to a cylindrical tubular walled portion (126) of the armature (40). The air gap is defined by two confronting, but axially spaced apart, axially extending wall portions (66, 82) of the stator structure. A non-magnetic sleeve member (110) has a tubular cylindrical side wall disposed radially between these stator wall portions and the cylindrical tubular walled portion of the armature. The sleeve has an end wall disposed for abutment with the armature to define a limit of axial travel for the armature-pintle assembly and to provide a spring seat for a helical coiled spring that biases the armature-pintle assembly normally closed. More accurate assembly of component parts and shaping of certain parts provide better control and reduced hysteresis.

9 Claims, 3 Drawing Sheets

ELECTROMAGNETIC ACTUATOR ARRANGEMENT FOR ENGINE CONTROL VALVE

FIELD OF THE INVENTION

This invention relates generally to electromagnetic actuated engine control valves, such as exhaust gas recirculation (EGR) valves for internal combustion engines, and is particularly directed to a new and improved electromagnetic actuator arrangement for such valves.

BACKGROUND AND SUMMARY OF THE INVENTION

Controlled engine exhaust gas recirculation is a commonly used technique for reducing oxides of nitrogen in products of combustion that are exhausted from an internal combustion engine to atmosphere. A typical EGR system comprises an EGR valve that is controlled in accordance with engine operating conditions to regulate the amount of engine exhaust gas that is recirculated to the induction fuel-air flow entering the engine for combustion so as to limit the combustion temperature and hence reduce the formation of oxides of nitrogen.

Since they are typically engine-mounted, EGR valves are subject to a harsh operating environment that includes wide temperature extremes and vibrations. Exhaust emission requirements impose more stringent demands for improved control of such valves. Use of an electric actuator is one means for obtaining improved control, but in order to commercially successful, such an actuator must be able to operate properly in such extreme environments for an extended period of usage. Moreover, in mass-production automotive vehicle applications, component cost-effectiveness is also essential. An EGR valve electric actuator that possesses more accurate and quicker response results in improved driveability and fuel economy for a vehicle having an internal combustion engine that is equipped with an EGR system. It also provides better control over tailpipe emissions.

The present invention relates to new and unique electromagnetic actuator arrangement that is capable of compliance with the demanding requirements for automotive applications. While the inventive principles have been especially adapted for an EGR-valve, these principles can have generic application to other types of automotive valves.

Generally speaking, the invention relates to improvements in an armature-pintle assembly and related stator structure of a solenoid actuator that controls the valve opening in accordance with an electric control current from an engine control system. More accurate assembly of component parts and shaping of certain parts provide better control and reduced hystersis.

Further features, advantages, and benefits of the invention will be seen in the ensuing description and claims that are accompanied by drawings. The drawings disclose a presently preferred embodiment of the invention according to the best mode contemplated at this time for carrying out the invention.

DESCRIPTION OF THE PREFERRED EMBODIMENT

Figure 1:
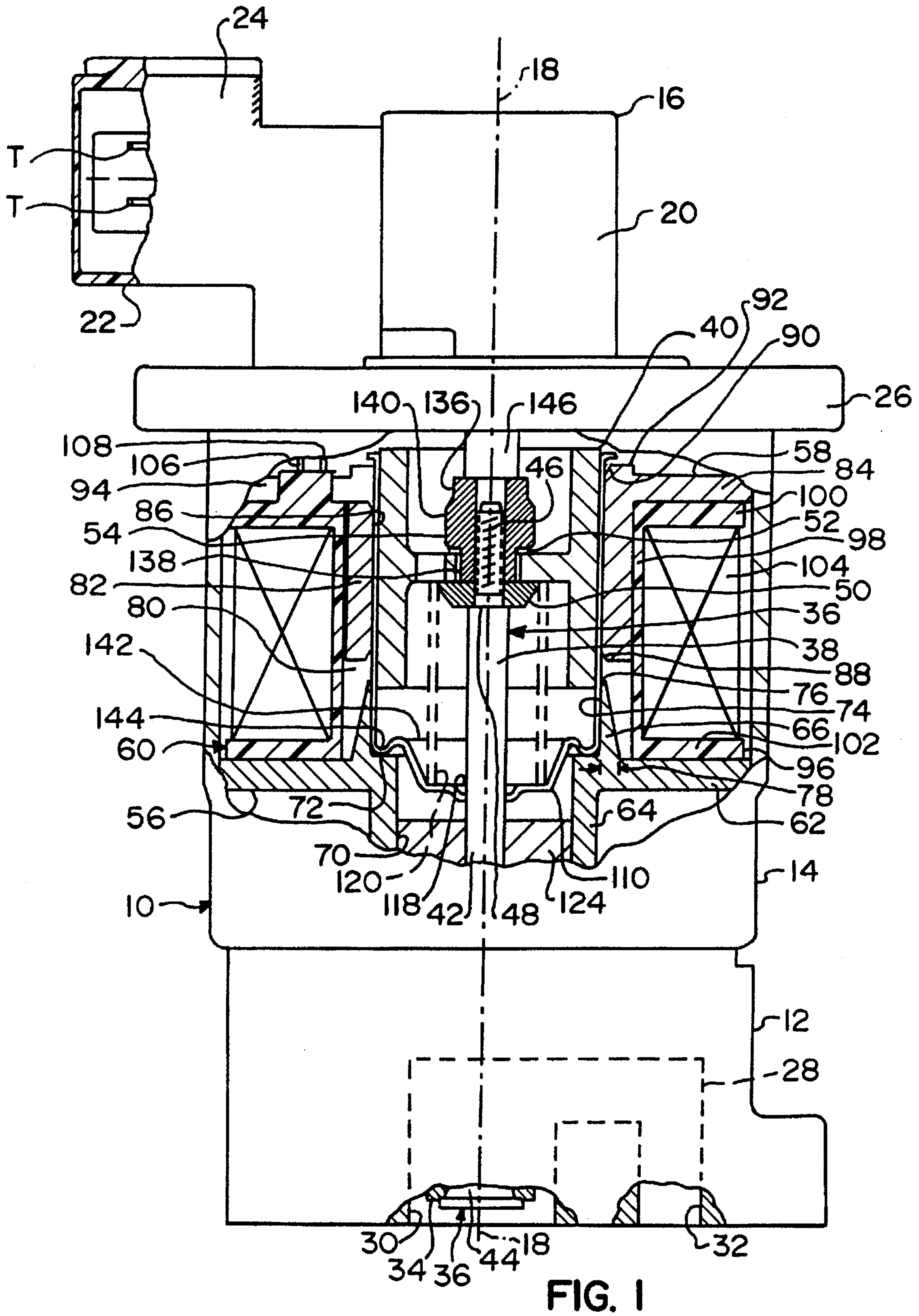
FIG. 1 is a front elevation view of an illustrative electric EGR valve (EEGR valve) embodying principles of the invention, certain portions of the Fig. having been removed for the purpose of illustrating internal detail relating to the inventive principles.

The drawing Figs. illustrate principles of the present invention in an electric EGR valve (EEGR valve) 10. FIG. 1 shows the general arrangement of EEGR valve 10 to comprise a metal base 12, a generally cylindrical metal shell 14 disposed on top of and secured to base 12, and a sensor cap 16 forming a closure for the otherwise open top of shell 14.

Base 12 comprises a flat bottom surface adapted to be disposed against a surface of an exhaust manifold of an internal combustion engine, typically sandwiching a suitably shaped gasket (not shown) between itself and the manifold. Base 12 comprises a flange having through-holes (not shown) that provide for the separable attachment of EEGR valve 10 to an exhaust manifold. For example, the manifold may contain a pair of threaded studs which pass through the flange through-holes and onto the free ends of which lock washers are first placed, followed by nuts that are threaded onto the studs and tightened to force base 12 toward the manifold, thereby creating a leak-proof joint between valve 10 and the manifold. Reference numeral 18 designates a main longitudinal axis of EEGR valve 10.

Sensor cap 16 is a non-metallic part, preferably fabricated from suitable polymeric material. In addition to providing a closure for the otherwise open top end of shell 14, sensor cap 16 comprises a central cylindrical tower 20 and an electrical connector shell 22 that projects radially outwardly from tower 20. Tower 20 has a hollow interior shaped to house a position sensor that is utilized for sensing the extent to which EEGR valve 10 is open. Sensor cap 16 further contains several electrical terminals T that provide for a solenoid coil assembly (to be described later) and such a sensor to be operatively connected with an engine electrical control system. Ends of terminals T are contained within shell 22 to form an electrical connector plug 24 that is adapted to mate with a mating plug (not shown) of an electrical wiring harness of an engine electrical control system. A clinch ring 26 securely attaches sensor cap 16 to shell 14.

Attention is now directed to details of the internal construction of EEGR valve 10 with reference to FIG. 1 and the subsequent drawing figures showing certain individual parts in greater detail.

Base 12 comprises an exhaust gas passageway 28 having an entrance 30 coaxial with axis 18 and an exit 32 that is spaced radially from entrance 30. Both entrance 30 and exit 32 register with respective passages in an engine exhaust manifold.

A valve seat 34 is disposed in passageway 28 coaxial with entrance 30. An armature-pintle assembly 36 that is also coaxial with axis 18 comprises a pintle 38 and an armature 40. Pintle 38 comprises a shaft 42 having a valve head 44 at the lower end and a threaded stud 46 at the upper end. Shaft 42 has a right angle shoulder 48 that is disposed just below threaded stud 46 and faces that end of the pintle. Valve head 44 is shaped for cooperation with an annular seat surface provided in seat 34 by a central through-opening in seat 34. Threaded stud 46 provides for attachment of the pintle to armature 40 by attachment means that includes a shim 50, a wave spring washer 52, and a calibration nut 54. FIG. 1 depicts the closed position of EEGR valve 10 wherein valve head 44 is seated closed on seat 34.

EEGR valve 10 further comprises a lower stator member 56, an upper stator member 58, and a solenoid coil assembly 60. Member 56 comprises a circular flange 62 immediately below which is a smaller diameter cylindrical wall 64 and immediately above which is a tapered cylindrical wall 66. A through-hole 68 extends centrally through member 56 and comprises in order from its lower to its upper end, a straight smaller diameter cylindrical surface 70, a right angle shoulder 72, and a straight larger diameter cylindrical surface 74. The upper edge surface 76 of wall 66 is relatively pointed and although it does have a finite radial thickness, that thickness is considerably smaller than the radial thickness 78 at the base of wall 66. The relatively pointed tapering of wall 66 is for the purpose of enhancing the magnetic characteristics of a magnetic circuit, to be more fully described hereinafter.

Figure 2:
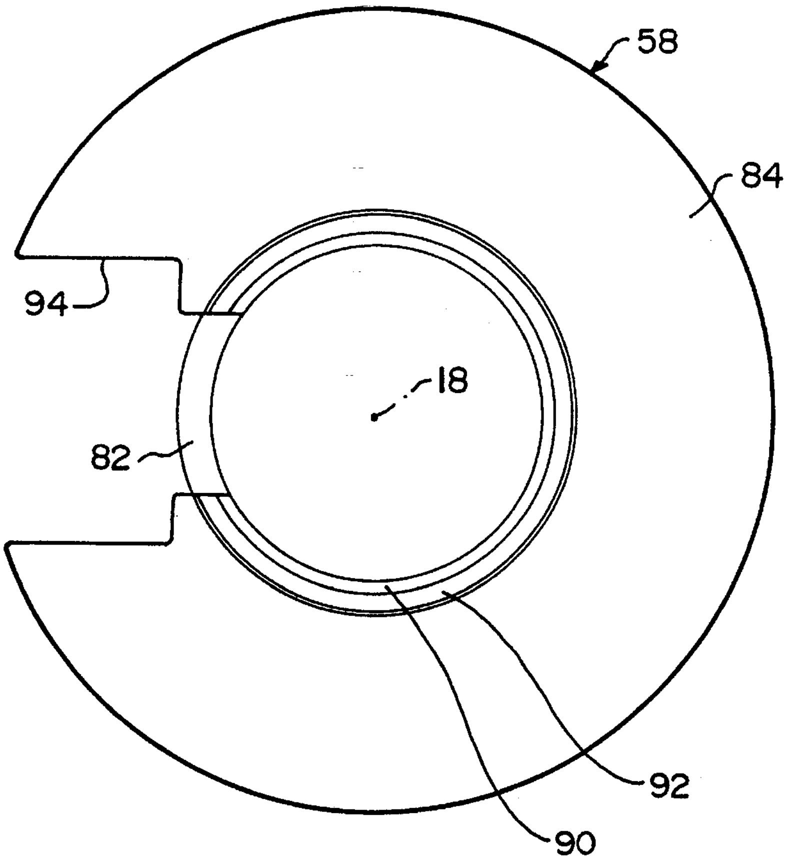
FIG. 2 is a top plan view of one internal part of the EEGR valve shown by itself, namely an upper stator member.

Upper stator member 58 is cooperatively associated with lower stator member 56 to provide an air gap 80 in the magnetic circuit. Details of upper stator member 58 appear in FIGS. 1–2. Member 58 comprises a straight cylindrical side wall 82 having a flange 84 extending around its outside proximate its upper end. The upper stator member further comprises a straight cylindrical through-hole 86 extending from a small chamfer 88 at the bottom of side wall 82 to a larger chamfer 90 at a raised ridge 92 at the top end of the member. A slot 94 is provided in a portion of flange 84 and ridge 92 to provide a clearance for an electrical connection from solenoid coil assembly 60 to certain terminals T of connector plug 24.

Solenoid coil assembly 60 is disposed within shell 14 between stator members 56 and 58. Solenoid coil assembly 60 comprises a non-metallic bobbin 96 having a straight cylindrical tubular core 98 coaxial with axis 18, and upper and lower generally cylindrical flanges 100 and 102 at the opposite axial ends of core 98. A length of magnet wire is wound on core 98 between flanges 100, 102 to form an electromagnet coil 104.

The bobbin is preferably an injection-molded plastic that possesses dimensional stability over a range of temperature extremes that are typically encountered in automotive engine usage. Electrical terminals 106 and 108 are mounted on flange 100 and a respective end segment of the magnet wire forming coil 104 is electrically connected to a respective terminal 106, 108.

Sensor cap 16 is also an injection-molded plastic part having two of the terminals T connecting respectively to terminals 106, 108 to provide for electrical connection of coil 104 with the engine electrical control system.

Figure 7:
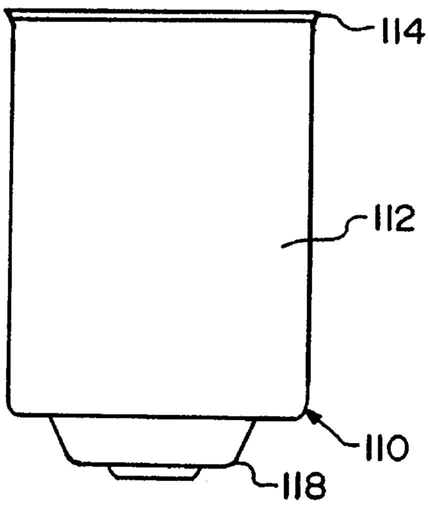
FIG. 7 is a front elevation view of yet another internal part of the EEGR valve shown by itself, namely a non-magnetic sleeve.
Figure 8:
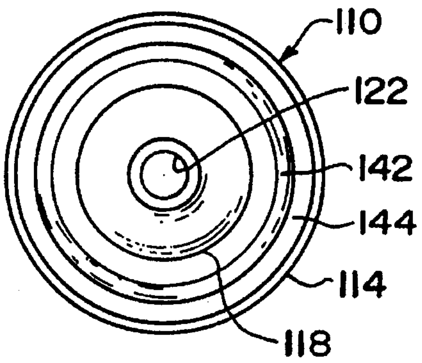
FIG. 8 is a bottom plan view of FIG. 7.

The accurate relative positioning of the two stator members 56, 58 is important in achieving the desired air gap 80 in a magnetic circuit that is provided by the two stator members and shell 14, all of which are ferromagnetic. A portion of armature 40 axially spans air gap 80, radially inward of walls 66 and 82. A non-magnetic sleeve 110, shown by itself in FIGS. 7 and 8, is disposed in cooperative association with the two stator parts and armature-pintle assembly 36. Sleeve 110 has a straight cylindrical wall 112 extending from an outwardly curved lip 114 at its upper end, to keep armature 40 separated from the two stator members. Sleeve 110 also has a lower end wall 116 that is shaped for three purposes: 1) to provide a cup-shaped spring seat 118 for seating a lower axial end of a helical coil spring 120; 2) to provide a small circular hole 122 for passage of pintle shaft 42; and 3) to provide a stop for limiting the downward travel of armature 40.

Guidance of the travel of armature-pintle assembly 36 along axis 18 is provided by a hole in a bearing member 124 that is press fit centrally to lower stator member 56. Pintle shaft 42 has a precise, but low friction, sliding fit in the bearing member hole.

Figure 3:
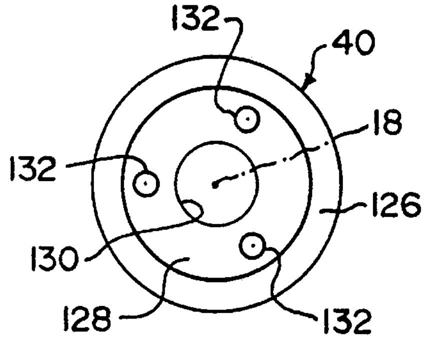
FIG. 3 is a top plan view of another internal part of the EEGR valve shown by itself, namely an armature member.

Armature 40, whose top plan view is shown by itself in FIG. 3, is ferromagnetic and comprises a cylindrical wall 126 coaxial with axis 18 and a transverse internal wall 128 across the interior of wall 126 at about the middle of the length of wall 126. Wall 128 has a central hole 130 that provides for the upper end of pintle 38 to be attached to the armature by the fastening means that includes shim 50, wave spring washer 52, and calibration nut 54. Wall 128 also has three smaller bleed holes 132 spaced outwardly from, and uniformly around, hole 130.

Shim 50 is circular in shape having flat, mutually parallel end wall surfaces between which extends a straight circular through-hole that is coaxial with axis 18. The shim's O.D. is tapered, as shown. Shim 50 serves three purposes: 1) to provide for passage of the upper end portion of pintle 38; 2) to provide a locator for the upper end of spring 120 to be substantially centered for bearing against the lower surface of wall 128; and 3) to set a desired axial positioning of armature 40 relative to air gap 80.

Figure 5:
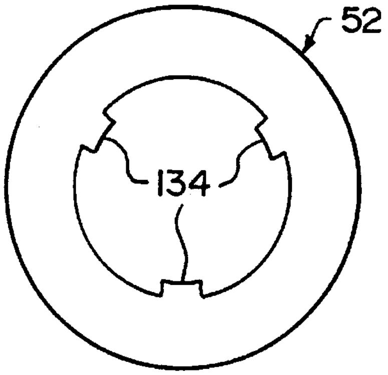
FIG. 5 is a top plan view, on a larger scale than in FIG. 1, of yet another internal part of the EEGR valve shown by itself, namely a wave spring washer.
Figure 6:
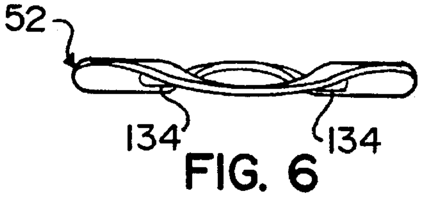
FIG. 6 is a front elevation view of FIG. 5.

Detail of wave spring washer 52 is shown in FIGS. 5 and 6 in its uncompressed shape. It has the annular shape of a typical wave spring washer, but with three tabs 134 equally spaced about its inner perimeter that are dimensioned for a very slight interference fit with a portion of calibration nut 54 to allow it to be retained on the nut for assembly convenience when attaching the pintle to the armature.

Figure 4:
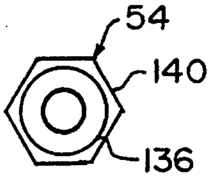
FIG. 4 is a top plan view of still another internal part of the EEGR valve shown by itself, namely a fastening nut.

The O.D. of calibration nut 54 comprises straight cylindrical end portions 136 and 138 between which is a larger polygonally shaped portion 140 (i.e. a hex, as illustrated in FIG. 4). End portion 138 has an O.D. that provides some radial clearance to hole 130. It is onto end portion 138 that wave spring washer 52 is assembled, prior to calibration nut 54 being threaded onto threaded stud 46 of the pintle. When calibration nut 54 is threaded onto threaded stud 46, wave spring washer 52 is axially compressed between the lower shoulder of hex 140 and the surface of wall 128 surrounding hole 130. The nut is tightened to a condition where shoulder 48 engages shim 50 to force the flat upper end surface of shim 50 to bear with a certain force against the flat lower surface of wall 128. The calibration nut does not abut shim 50. Wave spring washer 52 is, at that time, not fully axially compressed, and this type of joint allows armature 40 to position itself within sleeve 110 to better align to the guidance of the pintle that is established by bearing member 124. Hysteresis is minimized by minimizing any side loads transmitted from the pintle to the armature, or from the armature to the pintle, as the valve operates, and the disclosed means for attachment of the pintle to the armature is highly effective for this purpose.

Sleeve 110 is fixedly positioned within the valve. Sleeve 110 is formed with a curved rim 142 surrounding the top of spring seat 118. Rim 142 is convex toward armature 40 and is disposed in the downward path of travel of the armature. Between rim 142 and side wall 112, sleeve 110 has a downwardly convex rim 144 that bears against shoulder 72 of lower stator member 56. Rim 142 provides a stop for armature 40 that limits the extent to which armature-pintle assembly 36 can be displaced downwardly.

The closed position shown in FIG. 1 occurs when solenoid coil assembly 60 is not being energized by electric current from the engine electrical control system. In this condition, force delivered by spring 120 causes valve head 44 to be seated closed on seat 34. A plunger 146 associated with the position sensor contained within tower 80 of sensor cap 16 is self-biased against the flat upper end surface of calibration nut 54.

As solenoid coil assembly 60 is increasingly energized by electric current from the engine control system, magnetic flux increasingly builds in the magnetic circuit comprising the two stator members and shell 14, interacting with armature 40 at air gap 80 through non-magnetic sleeve 110. This creates increasing magnetic downward force acting on armature 40, causing valve head 44 to increasingly open passage 28 to flow. Bleed holes 132 assure that air pressure is equalized on opposite sides of the armature as the armature moves. Concurrently, spring 120 is being increasingly compressed, and the self-biased plunger 146 maintains contact with calibration nut 54 so that the position sensor faithfully follows positioning of armature-pintle assembly 36 to signal to the engine control system the extent to which the valve is open.

Armature 40 is accurately axially positioned relative to air gap 80 by controlling the axial dimension of shim 50. The axial distance between the air gap and the valve seat is measured. The axial distance along the pintle between the location where valve head 44 seats on the valve seat and shoulder 48 is measured. Based on these two measurements, the axial dimension of shim 50 can be chosen such that armature 40, when fastened to the pintle and disposed against shoulder 48, will be in a desired axial position to the air gap.

The position sensor is accurately calibrated to the axial position of the armature-pintle assembly by setting the axial location of the flat upper end surface of calibration nut 54. The axial dimension of the calibration nut is at least a certain minimum. The flat upper surface is ground, as required, to achieve a desired location that will cause plunger 146 to assume a desired calibration position when abutting the end of the calibration nut.

The dimensions of tapered wall 66, shoulder 72, and the thickness of armature side wall 126 are instrumental in defining the magnetic force vs. coil current characteristic, particularly as the lower end of the armature side wall comes increasingly closer to shoulder 72. The radial thickness of upper edge portion 76 and the taper angle of the wall 66 have been found important in establishing the characteristic. In an exemplary valve, the taper angle of wall 66 is nominally nine degrees, the radial thickness of edge portion 76 is 0.3175 mm, and the radial thickness of the base 78 is 1.26 mm. The O.D. of edge portion 76 is 24 mm. The radial thickness of shoulder 72 is 2.68 mm, and that of armature side wall 126 is about 2.8 mm. Hence from this example, it can be appreciated that the radial dimension of edge portion 76 is approximately one-fourth that of base 78, that the radial dimension of shoulder 72 is larger than that of base 78, and that the radial dimension of armature side wall 126 radially inwardly overlaps a radial inner edge of shoulder 72.

While the foregoing has described a preferred embodiment of the present invention, it is to be appreciated that the inventive principles may be practiced in any form that falls within the scope of the following claims.

What is claimed is:

1. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, an annular valve seat that is disposed within said passage concentric with an imaginary axis, an armature-pintle assembly that comprises an armature and a pintle and that is disposed within said enclosure for selective positioning along said axis, said pintle comprising a shaft extending from said armature to a valve head that is cooperatively associated with said valve seat for selectively setting the extent to which flow can pass through said passage in accordance with the position of said armature-pintle assembly along said axis, electromagnetic actuating means comprising a solenoid coil disposed within said enclosure concentric with said axis and stator structure disposed in association with said solenoid coil to provide a magnetic circuit for magnetic flux created when electric current flows in said solenoid coil, said stator structure comprising an air gap disposed concentric with said axis in proximate surrounding relationship to a cylindrical tubular walled portion of said armature that is concentric with said axis, said air gap being defined by two confronting, but axially spaced apart, axially extending wall portions of said stator structure, a non-magnetic sleeve member comprising a tubular cylindrical side wall concentric with said axis and disposed radially between said wall portions of said stator structure and said cylindrical tubular walled portion of said armature, said sleeve further comprising an end wall disposed for abutment with said armature to define a limit of axial travel for said armature-pintle assembly and to provide a spring seat, a helical coiled spring disposed between said spring seat and said armature biasing said valve head to seat on said seat member and close said passage in the absence of current flow in said solenoid coil, and being increasingly compressed as current flow in said coil increases to unseat said valve head from said valve seat and increasingly open said passage to flow.

2. An EEGR valve as set forth in claim 1 in which a first of said two confronting, but axially spaced apart, axially extending wall portions of said stator structure has a uniform radial thickness while a second of said two confronting, but axially spaced apart, axially extending wall portions has a radial thickness that progressively narrows in the direction toward said first axially extending wall portion.

3. An EEGR valve as set forth in claim 2 in which said sleeve member comprises between its side wall and the spring seat in its end wall a first rim portion that seats on a shoulder of said stator structure radially inward of said second axially extending wall portion, and a second rim portion that is disposed between said first rim portion and said spring seat for abutment by said armature to define said limit of axial travel for said armature-pintle assembly.

4. An EEGR valve as set forth in claim 1 wherein said armature comprises a transverse wall having a hole concentric with said axis, and further including a bearing member comprising a hole through which said pintle shaft passes with a close sliding fit for guiding the axial travel of said armature-pintle assembly, and fastening means for fastening said pintle to said transverse wall of said armature, said fastening means comprising a shoulder on said pintle shaft that faces said transverse wall of said armature, a threaded stud extending from said shoulder through said hole in said transverse wall of said armature, an annular shim having opposite axial faces, a first of which is disposed against said shoulder and a second of which is disposed against said transverse wall of said armature around said hole in said transverse wall of said armature, a nut that is threaded onto said threaded stud and that is tightened to compress a wave spring washer between itself and said transverse wall of said armature to allow said armature to position itself within said sleeve member so that ideally no side load is transmitted from said armature to said pintle shaft that might adversely affect the sliding fit of said pintle shaft in said hole of said bearing member.

5. An EEGR valve as set forth in claim 4 in which said shim provides a locator for locating said spring to said armature, and the axial dimension of said shim sets calibration by establishing a relative position of the armature to the air gap.

6. An EEGR valve as set forth in claim 4 including a position sensor having a plunger that follows positioning of said armature-pintle assembly along said axis to signal the position of said valve head to said valve seat, and in which said nut comprises a polygonally shaped surface for engagement by a tool for tightening said nut and an axial end surface against which said plunger is self-biased to follow the position of said armature-pintle assembly.

7. An EEGR valve as set forth in claim 6 in which said end surface of said nut is ground to a desired distance from said transverse wall of said armature to provide desired calibration of said position sensor.

8. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, an annular valve seat that is disposed within said passage concentric with an imaginary axis, an armature-pintle assembly that comprises an armature and a pintle and that is disposed within said enclosure for selective positioning along said axis, said pintle comprising a shaft extending from said armature to a valve head that is cooperatively associated with said valve seat for selectively setting the extent to which flow can pass through said passage in accordance with the position of said armature-pintle assembly along said axis, electromagnetic actuating means comprising a solenoid coil disposed within said enclosure concentric with said axis and stator structure disposed in association with said solenoid coil to provide a magnetic circuit for magnetic flux created when electric current flows in said solenoid coil, said stator structure comprising an air gap disposed concentric with said axis in proximate surrounding relationship to a cylindrical tubular walled portion of said armature that is concentric with said axis, said air gap being defined by two confronting, but axially spaced apart, axially extending wall portions of said stator structure, a non-magnetic sleeve member comprising a tubular cylindrical side wall concentric with said axis and disposed radially between said wall portions of said stator structure and said cylindrical tubular walled portion of said armature, a helical coiled spring acting on said armature-pintle assembly for biasing said valve head to seat on said seat member and close said passage in the absence of current flow in said solenoid coil, and being increasingly compressed as current flow in said coil increases to unseat said valve head from said valve seat and increasingly open said passage to flow, in which a first of said two confronting, but axially spaced apart, axially extending wall portions of said stator structure has a uniform radial thickness while a second of said two confronting, but axially spaced apart, axially extending wall portions has a radial thickness that progressively narrows in the direction toward said first axially extending wall portion to terminate in an end edge surface, and said stator structure comprises an internal shoulder spaced axially from said end edge surface in the direction away from said first axially extending wall portion.

9. An EEGR valve as set forth in claim 8 in which the radial dimension of said end edge surface of said second wall portion is approximately one-fourth that of the base of said second wall portion, said shoulder has a radial dimension larger than that of said base of said second wall portion, and the radial dimension of said cylindrical tubular wall portion of said armature radially inwardly overlaps a radially inner edge of said shoulder.

* * * * *